United States Patent
Torba et al.

(10) Patent No.: US 6,563,788 B1
(45) Date of Patent: *May 13, 2003

(54) METHOD AND APPARATUS FOR CALL DISTRIBUTION AND OVERRIDE WITH PRIORITY RECOGNITION AND FAIRNESS TIMING ROUTINES

(75) Inventors: Dmitriy A. Torba, San Bruno, CA (US); Yuri Shtivelman, Belmont, CA (US); Dan Kikinis, Saratoga, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/366,434

(22) Filed: Aug. 2, 1999

Related U.S. Application Data (63) Continuation-in-part of application No. 09/024,825, filed on Feb. 17, 1998, now Pat. No. 6,044,146.

(51) Int. Cl.$^7$ ............................. H04J 1/16; H04J 3/14
(52) U.S. Cl. ..................................... 370/229; 370/410
(58) Field of Search ............................. 370/412, 428, 370/229, 352, 356, 238, 395.42, 395.43, 230, 235, 236, 389, 410, 401; 709/203, 205

(56) References Cited

U.S. PATENT DOCUMENTS

| | | | | |
|---|---|---|---|---|
| 5,940,496 A | * | 8/1999 | Gisby | 379/264 |
| 5,953,332 A | * | 9/1999 | Miloslavsky | 370/352 |
| 6,044,146 A | * | 3/2000 | Gisby | 379/265 |
| 6,134,217 A | * | 10/2000 | Stiliadis | 370/232 |
| 6,157,655 A | * | 12/2000 | Shtivelman | 370/412 |
| 6,259,786 B1 | * | 8/2001 | Gisby | 379/266 |
| 6,377,583 B1 | * | 4/2002 | Lyles | 370/412 |
| 6,396,834 B1 | * | 5/2002 | Bonomi | 370/394 |
| 2001/0043586 A1 | * | 11/2001 | Miloslavsky | 370/352 |
| 2002/0012428 A1 | * | 1/2002 | Neyman | 379/242 |

* cited by examiner

*Primary Examiner*—Ajit Patel
*Assistant Examiner*—Chirag Shah
(74) *Attorney, Agent, or Firm*—Donald R. Boys; Central Coast Patent Agency, Inc.

(57) ABSTRACT

A method for promoting fairness in a communication center in response to requests for destination numbers (DNs) from network-level routers has steps of determining latency for requests from individual ones of the network-level routers, receiving a request from a first router for which latency is determined, assigning a fairness wait time to the request, the time determined as an inverse function of latency, and answering the request according to rules in effect only after the wait time has expired. In some cases requests arrive with priority, and priority is used a swell as latency in determining wait time. In other cases a second fairness time is imposed, after which a fairness algorithm is called to award a DN according to statistical history and cal priority. The system is useful for communication centers for connection-oriented telephone systems, Internet protocol systems, and for all sorts of digital messaging and mail systems.

15 Claims, 7 Drawing Sheets

Agent Status (Real-Time Request and Priority Assignment)

*Fig. 3*

Agent Status (Real-Time Request and Priority Assignment)

METHOD AND APPARATUS FOR CALL DISTRIBUTION AND OVERRIDE WITH PRIORITY RECOGNITION AND FAIRNESS TIMING ROUTINES

CROSS-REFERENCE TO RELATED DOCUMENTS

The present patent application is a continuation-in-part of application Ser. No. 09/024,825 filed on Feb. 17, 1998 now Pat. No. 6,044,146, and titled "Method and Apparatus for Call Distribution and Override with Priority".

FIELD OF THE INVENTION

The present invention is in the field of telephony including multimedia communications. The present invention has particular application to methods for call priority assignment, distribution, and override for call distributing and routing functions associated with incoming calls from multiple service control points (SCP's) to a communication center. The methods pertain more particularly to assigning priority states to calls and applying-fairness treatment associated with requested DN's as applied to the separate external SCP sources.

BACKGROUND OF THE INVENTION

The present invention relates in preferred embodiments to call-centers in the art of telephony systems. Call centers are typically hosted by a company or organization for purposes of providing a service to clients, such as technical assistance or catalogue sales and the like. In a typical call center agents are employed at agent stations having at least one telephone, and in many cases other equipment, such as a personal computer with a video display unit (PC/VDU).

Modem call centers typically have call-switching equipment for directing incoming calls to telephones at agent stations, and computer integration with the switching equipment is now common. This technique is known in the art as computer telephony integration (CTI). In a CTI system a processor is connected to the switching equipment by a CTI link, and the processor runs CTI applications controlling the switch. PC/VDUs at agent stations may be interconnected on a local area network (LAN) also connected to the CTI processor.

Development of CTI call centers has made it possible for agents to interact with callers (clients) in more ways than just by telephone. In a suitably equipped call center, agents can operate with E-mail, Video mail, Video calls, and Internet Protocol Network Telephony (IPNT) calls as well as plain old telephony service (POTS) calls, which are more recently classified as connection-orientated-switched-telephony (COST). In more recent art, the term call-center could arguably be discarded for the purpose of discussion with the term communication center being more appropriately applied to reflect added capabilities. Therefore, the term communication center will be used hereinafter as a substituted descriptive term that describes a call or call-in center of more recent art.

As previously described, a modern communication center may be linked to other communication centers, databases, and the like in a variety of ways, such as by local area networks (LAN), wide area networks (WAN), including the World Wide Web (WWW).

Communication centers are organized to receive and distribute incoming calls to a plurality of agents at the center. There may be a large volume of incoming calls and a large number of agents. As described above, calls are not limited to COST calls, but may include communications of many other sorts. Call routing to and within call centers involves processors and software dedicated to directing calls to appropriate agents for processing and response.

An organization having one or more communication centers for serving customers typically provides one or more telephone numbers to the public or to their customer base, or both, that may be used to reach the service. The number or numbers may be published on product packaging, in advertisements, in user manuals, in computerized help files, and the like.

There are basically two scenarios. If the organization providing the service has a single communication center, the number will be to that center and all further routing to an agent will be performed within center. If there are several communication centers, the organization may provide several numbers, one for each communication center, and the customer may be expected to use the number for the closest center, or for the center advertised to provide specifically the service he or she might need. In some cases the number provided will connect the caller with a first Service Control Point (SCP) which is adapted to pre-process incoming calls and forward the calls to other call centers.

Routing of calls, then, may be on several levels. Pre-routing may be done at Service Control Points (SCPs) or other network access points at the network level and further routing may be, and generally is, accomplished at individual communication centers.

To distribute incoming calls to agents in a communication center, the distribution system has to have some criteria for distribution. Most commonly there is capability for the distribution system to track which phones are on hook or off hook, so the system may monitor which agents are busy on calls or not busy. In the simplest system, then, calls are distributed on a first-in-first-out basis to available agents.

It has occurred to the inventors that a desirable goal relating to call center communication is to have agents busy on high priority calls rather than spending a lot of time covering calls of a lesser importance. For example, a high priority call may be a sales order call wherein the caller is purchasing a product or service over the telephone. A lesser priority call may be a caller who is just curious about the product or service and has a few questions to ask the agent. In a typical first in first out (FIFO) queue situation, the fist call in is the first call out regardless of importance of the call, and there is typically no facility for prioritizing calls. It would be desirable as well to be able to transfer a higher priority call to be taken by an agent who is currently engaged with a lower priority call, without having to lose the original call.

An issue that can complicate achievement of the desirable goals described above arises when incoming calls to a communication center are sourced from separate routing systems in a network that experience varied latency rates such as from multiple SCP's.

In a very large communication center, it is desired that all incoming calls whether from a COST network or from an Internet-protocol-network-telephony (IPNT) network are handled efficiently by available agents. In some cases calls are routed from network level to a call center, and then further routed to agents at the communication center. Calls are typically distributed to such agents based on availability of the agent, and in this system availability of agents is tracked at the call center level. In other systems, employing what the inventors term agent-level routing, Service Control Points (SCPs) in the network route calls to agent level at call centers. In this arrangement agent availability is typically tracked at the network level, and updated from the call-center level.

In either system described above, if a first agent is not available, a caller must wait for the agent to become available, or be transferred to another available agent. When incoming calls to a communication center are from different routing systems in a telephony network it becomes difficult to insure equal and fair access to agents for all of the callers. This is due to various states of latency that exist in separate routing systems.

Latency factors such as equipment speed and line speed can vary greatly over large geographical regions within a service network such as a public network. This is due to partly to the fact that older equipment is upgraded to new equipment on a gradual basis. The same is true with network lines and connections. Because of this inconsistency over large portions of a telephony network, some callers or groups of callers to a communication center may inadvertently get much better service because of the fact that they are being routed over faster lines with better equipment. In considering DNT networks, similar latency conditions exist that may cause some callers or groups of callers to receive poor service compared to those routed in over superior connections with superior equipment.

If priority states are to be observed in a communication center where incoming calls are sourced from different routing systems, then it is desirable to blend the two objectives thus taking into account the problem of assigning priority levels for all incoming calls, and the problem of certain calls receiving preferential treatment because they are sourced from a lower latency routing system.

What is clearly needed is a priority determination method and control routine that will enable determination and assignment of priority to an incoming call that also applies a fairness timing method for "agent reservation" calls when such calls are from latency-variant and separate routing systems in a network. Availability in such a system could ideally be adjusted according to priority of any call, which an agent may be processing. Additionally, any calls that are bumped could be re-queued, and same priority calls from separate routing systems could have equal access to agents regardless of existing latency factors associated with the specific routing system responsible for the calls.

SUMMARY OF THE INVENTION

In a preferred embodiment of the present invention, in a communication center, a method for promoting fairness in response to requests for destination numbers (DNs) from network-level routers is provided, comprising steps of (a) determining latency for requests from individual ones of the network-level routers; (b) receiving a request from a first router for which latency is determined; (c) assigning a fairness wait time to the request, the time determined as an inverse function of latency; and (d) answering the request according to rules in effect only after the wait time has expired.

In some cases there is a further step for starting a second fairness timer after the wait time, and at the end of the second time period, a step is provided, if there are requests from other than the first router for the same DN, for calling a fairness algorithm to determine which router gets the DN. Requests may be for telephony connections, either connection-oriented switched telephony (COST) or Internet Protocol Network Telephony (IPNT) calls, and for other sorts of messaging as well. In another aspect of the invention, in a communication center, a method for promoting fairness in response to prioritized requests for destination numbers (DNs) from network-level routers is provided, comprising steps of (a) noting latency for individual ones of the network level routers; (b) delaying requests by time based on latency to promote fairness; and (c) adjusting fairness time according to priority. Wait time is typically increased for faster routers and decreased for higher priority.

In yet another aspect a communication center is provided, comprising a communication switching device connected to agent stations having destination numbers (DNs) for switching communications to individual ones of the agent stations; a computer-telephony integration (CTI) processor coupled to and monitoring and controlling the communication switching device; and a digital link between the CTI processor and network-level routers having determined latency, for receiving requests from the network-level routers for connection to DNs. The CTI processor, on receiving a request from a router for a DN, checks the router's latency, and assigns a wait time according to the latency before processing the request. In some embodiments of this communication center requests are received with priority assigned, and the wait time is adjusted according to the priority.

In yet another aspect of the invention a communication center is provided, comprising a communication switching device connected to agent stations having destination-numbers (DNs)-for switching communications to individual ones of the agent stations; a computer-telephony integration (CTI) processor coupled to and monitoring and controlling the communication switching device; and a digital link between the CTI processor and network-level routers, for receiving requests from the network-level routers for connection to DNs, the requests having priority assigned. The CTI processor, on receiving a request from a router for a DN, imposes a fairness wait time after which, if more than one router has requested a same DN, statistical history and priority are used by a fairness algorithm to award the DN to one of the routers. Latency and priority may be used to adjust the fairness wait time, and the system is useful for such as telephony connections, either connection-oriented switched telephony (COST) or Internet Protocol Network Telephony (IPNT) calls.

In this communication center, the CTI processor may start an agent reservation timer at the same time as starting the fairness timer, the agent reservation timer having a period longer than that of the fairness timer. The period of the agent reservation timer is typically longer than that of the fairness timer by a time sufficient for a connection to be made to the agent station once access is granted, and for notification of the connection to be made to network-level entities.

In yet another aspect of the invention an agent-reservation fairness software suite for operation in a communication center and dealing with requests by network-level routers for connection to agents at communication center destination numbers (DNs) is provided, comprising a monitor for monitoring incoming requests for connection to agents; a table of latency for individual ones of the routers; a time generator for setting a wait time according to latency; and an initiator for starting a fairness wait timer having a fairness time-out period. The monitor, on receiving a request from a router, checks latency for the router, the time generator generates a time-out time based on the latency, and the initiator starts the timer for the generated time-out period, after which the request is processed.

In this software suite requests may come with a priority indication, and the time generator may then incorporate the priority along with latency into determining the time-out time. There may further be a fairness determinator, which, after the fairness time out period, if there are plural requests for a same DN during the time-out period, determines which router gets the DN based on a fairness algorithm. In some cases the fairness time is a constant, and priority is included in the fairness algorithm to determine which router gets a DN.

In various embodiments of the present invention, taught in enabling detail below, for the first time a communication system may be provided wherein fairness may be promoted over a plurality of routers to the center, such that slower routers may have an equal chance to get requests granted for destination numbers, and wherein priority may also be taken into account.

DESCRIPTION OF THE PREFERRED EMBODIMENTS

Figure 1:
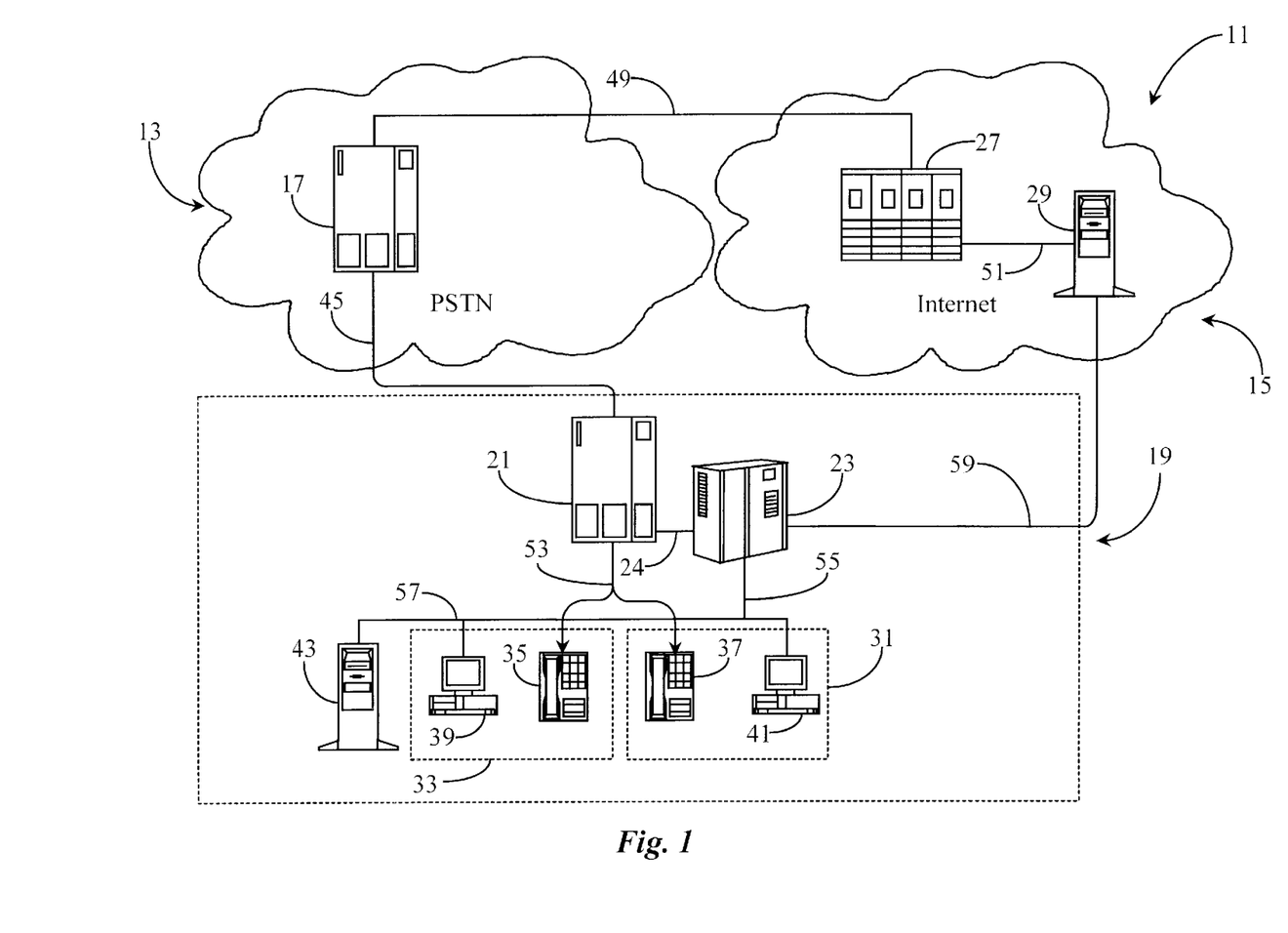
FIG. 1 is an overview of a call center environment wherein call distribution is based on call priority level according to an embodiment of the present invention.

FIG. 1 is an overview of a call center environment wherein call distribution is based on call priority levels according to an embodiment of the present invention. A telephony communications network 11 comprises a call center 19 connected to a publicly-switched telephony network (PSTN) 13 and connected also to the Internet 15. Telephony communication systems with Internet connectivity such as telephony communication system 11 are known to the inventors, and are capable of multi-media and Internet-Protocol communication.

A telephony switch 17 in the PSTN is illustrated to represent any call handling equipment in the network, which may be extensive including computer integration. COST calls from the network are delivered over at least one broad-band telephony trunk 45 or an equivalent of one or more regular trunks to a telephony switch 21 within call center 19. It will be apparent to the skilled artisan that the PSTN may also be a private network rather than a public network and Internet 15 may be of the form of another wide area network (WAN) such as are known in the art. The embodiment illustrated herein represents just one example of a telephony communications environment that can utilize the method and apparatus of the present invention. Further, the method and apparatus of the present invention can be implemented in a telephony communications system that is not linked to a WAN, or, in a WAN communications system that is not liked to a telephony network. However, in a preferred embodiment, the present invention is utilized with voice calls arriving at a call center such as call center 19 within the scope of CTI telephony architecture.

Referring again to FIG. 1, COST calls from PSTN 13 are, in this embodiment, routed to telephony switch 21. A CTI processor 23 is linked to switch 21 via a CTI link 24. CTI processor 23 provides computer enhancement to call center 19. Routing protocol and similar control routines such as statistical and skill based routines may be stored and executed via processor 23. Processor 23 is, in this embodiment, connected to a LAN 57. LAN 57 also interconnects PC/VDUs at individual agent stations within call center 19 such as an agent station 31 and an agent station 33. Agent station 31 comprises an agent's telephone 37 and an agent's PC 41. Agent station 33 comprises an agent's phone 35 and an agent's PC 39. A client information system (CIS) data server 43 is also connected to LAN 57. CIS data server 43 is used to store information regarding clients, such as transaction history, preferences, order information, and the like.

It will be apparent to those with skill in the art that there may be other servers connected to LAN 57 for various purposes, such as routing and the like.

Processor 23 is linked to an Internet File-Server 29 via a digital connection 59. Switch 17 in PSTN 13 is shown connected to connected to Internet Service Provider (ISP) 27 via connection 49. The Internet connectivity is meant to show only that client's with access to PSTN 13 may have multiple ways to communicate with agents at call center 19, such as Internet-based multimedia communication as well as COST communication. WAN access such as access to Internet 15 may be of the form of a dial-up connection or a connection that remains open so that agent's PC's are continually connected to Internet 15 while an agent at the agent station is logged in.

It is an object of the present invention to assign priority to incoming calls and to route calls to agents at the call center based on the assigned priority, together with information about agent skill and status. The invention may be practiced, as will be seen, relative to COST calls, video calls, e-mail, and to any other type of communication directed to a plurality of persons such as agents at a call center. The features of the invention will be made clear by considering an embodiment directed to routing COST calls to agents at stations in a call center.

Figure 2:
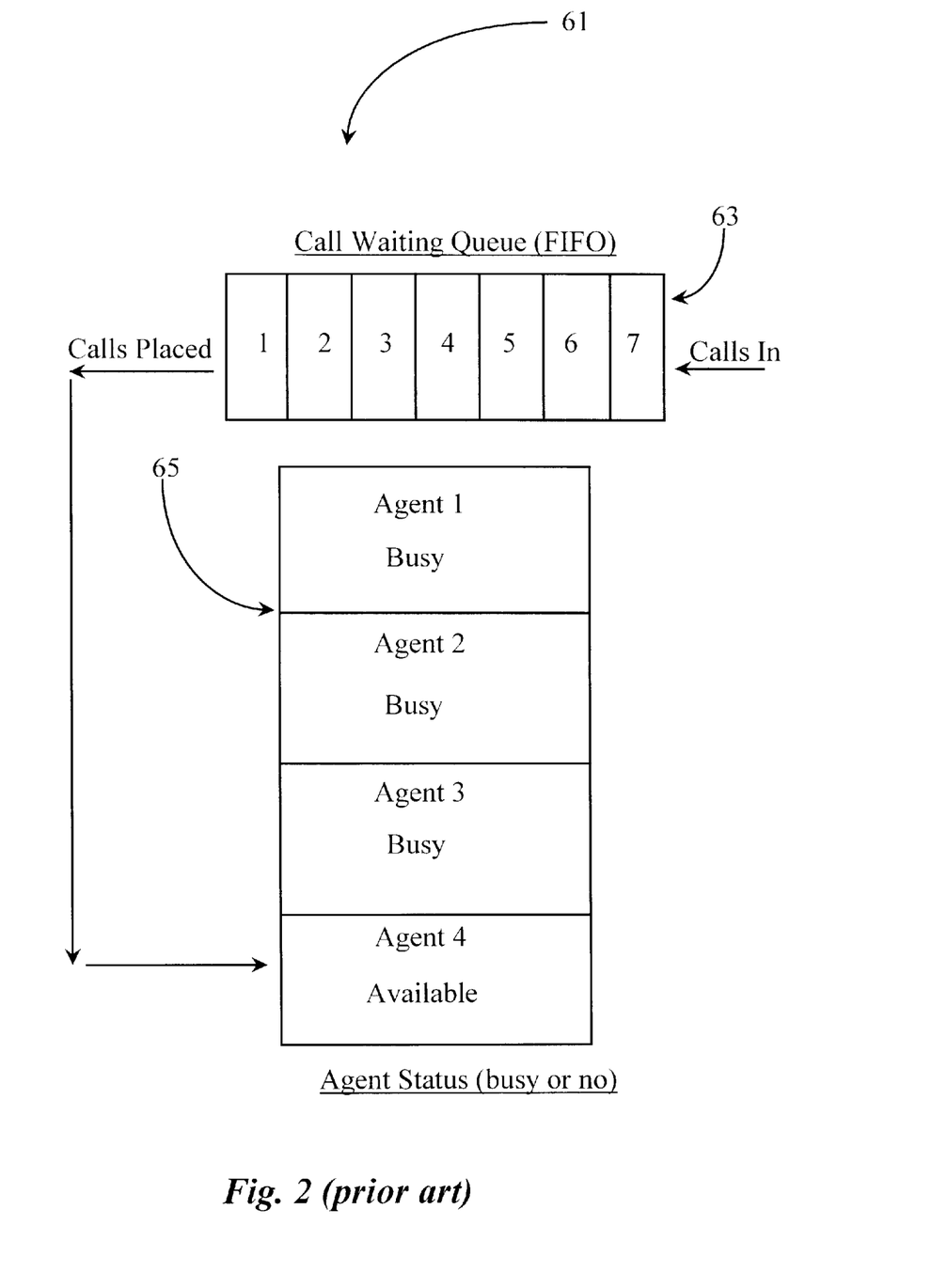
FIG. 2 is a block diagram illustrating a typical call-waiting queue and system according to prior art.

FIG. 2 is a block diagram illustrating a typical call-waiting queue according to prior art wherein there is no priority assigned or multi-state reporting status concerning agent availability. Arriving calls are handled in a first-in-first-out (FIFO) queue 63 and are distributed to an agent group 65. In this prior art illustration queue 63 has 7 calls waiting, numbered 1–7, in the order that they were received. Agent group 65 comprises 4 agents 1–4 and agents 1–3 are busy with prior distributed calls. Agent 4 is determined to be available (not currently engaged in a phone conversation). In this simple prior art situation, call number 1 is distributed to agent number 4 without regards to priority. Calls 2–7 will be placed in order one at a time to next available agents without respect to priority.

Referring now to FIG. 1, a call distribution scheme as illustrated with reference to FIG. 2 may be accomplished by a CTI application executed on processor 23 relative to arriving calls at switch 21. The CTI application monitors switch 21 for incoming calls to a routing or call-distribution point. The status of telephones at agent stations is also monitored, so the application has access to real-time information as to which logged-in agents are busy on a call and which are not. The application operates to command switch 21 to distribute calls on a FIFO basis to logged-in available agents.

In this prior art example, there is no method for determining agent availability with regard to multiple agent states or skill-set. It can also be seen that there is no method for assigning call priority levels to calls 1–7 or using such priority in call routing. It will be apparent to those with skill in the art that the software to accomplish call distribution may be executed on processor 23, or on any other processor connected to LAN 57 with appropriate communication with the CTI application that senses activity of the call center and commands switch 21 or with the switch 21 directly.

Figure 3:
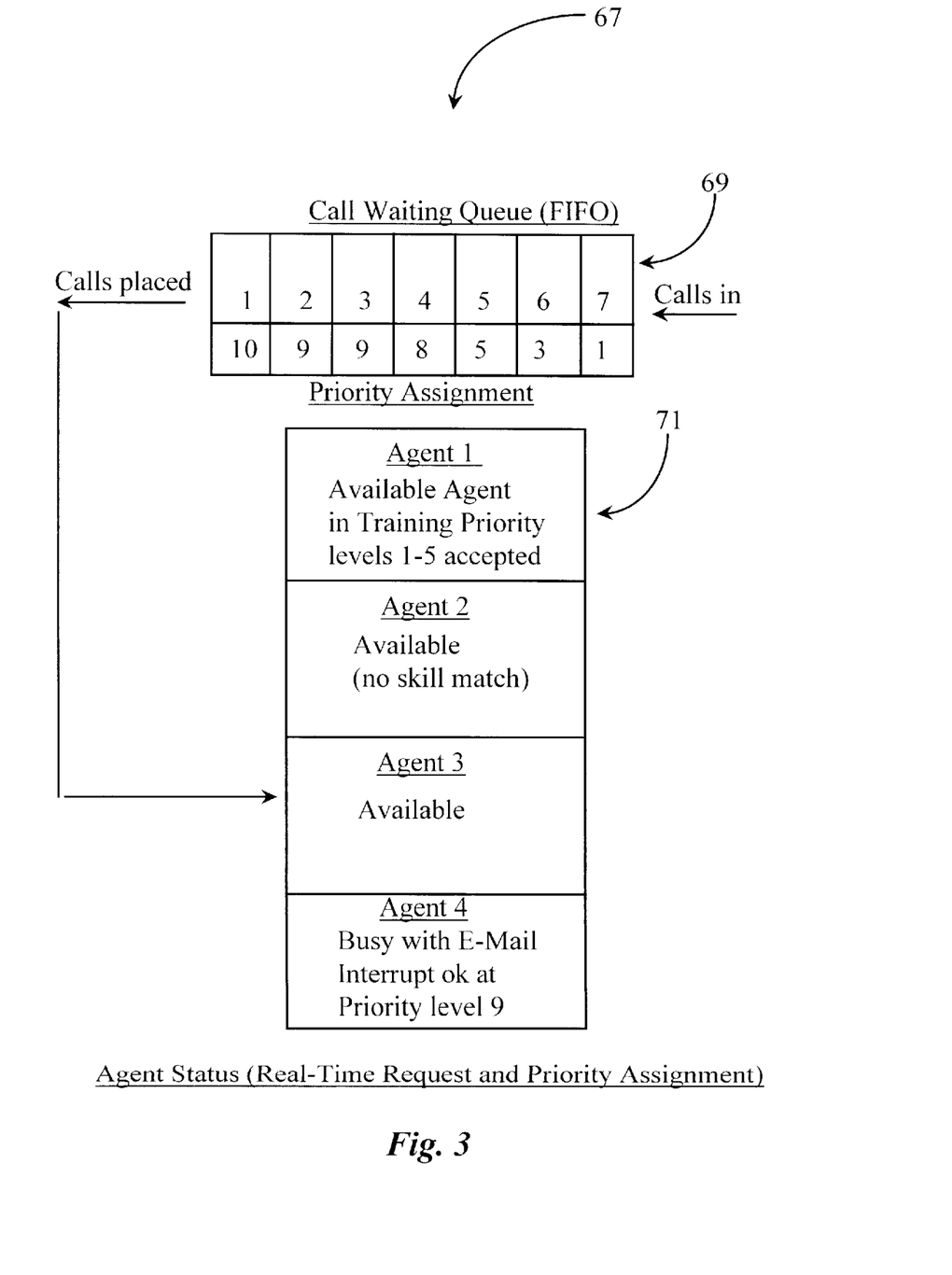
FIG. 3 is a block diagram illustrating a call-waiting queue and system enhanced with call priority assignment and distribution capabilities according to an embodiment of the present invention.

FIG. 3 is a block diagram illustrating a call-waiting queue and distribution scheme enhanced with call priority assignment and distribution capabilities according to an embodiment of the present invention. In the embodiment of FIG. 3 the call distribution scheme comprises a queue 69 and an agent group 71. Queue 69 shows waiting calls 1–7 that have been placed in queue 69 based on a priority determination with an assigned priority level from 1–10 assigned to each call. For example, call 1 has been assigned a highest priority level 10 while calls 2 and 3 have been assigned a priority level 9 and so on. Call 1 is at the head of the queue for distribution not because it was the first to arrive at the routing point in the switch, but because it was found to have the highest priority. The position of all waiting calls in the queue depends on priority assignment. A new call arriving and assigned a higher priority than a call already in the queue, will be placed in the queue ahead of the lower priority call, reorganizing the order of the queue.

Software to accomplish the novel priority-based distribution of calls as described relative to FIG. 3 may be executed on any processor accessible to and compatible with a CTI application operating in conjunction with switch 21 in the call center, just as was described for the scheme of the prior art.

To assign priority to incoming calls, and to associate the assigned priority with the call as a sub-state or attribute of the call for management purposes requires a mechanism for according and assigning the priority. This sub-system is represented as process 67 in FIG. 3. It will be apparent to those with skill in the art that there are many sources of information, which may be tapped for this determination. For example, in many call centers, client information may be stored in a database accessible to the priority process (server 43, FIG. 1). Arriving calls have at least a caller-ID, from which may be used as a key to the database. Priority rules may then be established that calls from certain clients are always to be given high priority, or specific priority.

Further to client database, in many enhanced call centers known to the inventors, information may be elicited from callers (clients) at processing points in the network, and the information transferred to the call center with or ahead of the call. This information may be sorted and used according to preprogrammed rules to assign priority. Still further, equipment at the call center may be assigned to interface with callers and to elicit information. That is, an incoming call may be first connected to an IVR for the purpose of determining a client's intent, and then the system may assign priority and place the call in the queue according to the elicited information, or in conjunction with other information. Many such possibilities are extant for priority determination and assignment.

There are combinations of apparatus and rules that may be arranged for priority assignment, as described above. For further example, a call priority system may be as simple as assigning calls a priority level of 1–10. Sales agents may handle calls with priority levels 7–10 while service agents handle calls with priority levels 4–6 leaving calls with priority levels 1–3 for IVR's, automated fax responses, or perhaps, live information agents. Information gathered about the caller at the network level via methods known in the art along with any information already known about the caller is used to categorize the call and assign a priority. The call will be routed based upon that priority assignment. It will be apparent to one with skill in the art that priority level rules may vary widely depending upon the type of business. For example, a sales organization would use different criteria than a service organization. Call priority designations may be based on virtually any type of information known about or elicited from a call and caller. For the purpose of clarity in description, a 1–10 priority assignment is used in examples herein.

The software of the present invention, in one preferred embodiment, as also described above, may be executed in processor 23 or another processor linked to LAN 57 and also linked to telephony switch 21. In some embodiments, however, priority assignment and distribution may be performed either partly or entirely at the network level with software according to the present invention residing in a telephony switch-connected processor within a network such as PSTN network 13.

After placement in the queue for distribution, according to an assigned priority, calls are routed to a next available agent according to further programmed rules. In a preferred embodiment agents at a call center are also assigned substates. Some agents, for example, may be agents-in-training, and restricted to rules handling only low-priority calls. Other agents may be reserved for only the highest priority calls, for example.

According to a preferred embodiment, calls in progress with an agent can also be bumped with reference to priority level. In this embodiment, for instance, if an agent at agent station 31 is busy on a priority 6 call, and a priority 10 call comes to the head of the queue, then the priority 10 call would be routed to the agent, and the call in progress would be bumped.

In one embodiment suitable notification is made to the agent regarding the priority status of the next call so that the agent may dispose of the level 6 call in order to handle the more important call. Notification to the agent may be made via PC screen pop-up, audible alert, or any other method known in the art.

In some embodiments the level 6 call may be placed back in queue retaining it's priority status with regards to priority stacking within the queue. In other embodiments the displaced call may be transferred directly to another agent (if available), an interactive voice response (IVR) unit, etc. In an embodiment of the invention a lower priority call can be overridden by a higher priority call without losing the original call. Of course, in some embodiments a displaced call could just be terminated. Ideally this would not be the case.

It will be apparent to the skilled artisan that there may be a broad variety of rules and conditions with regards to agents such as incorporating various sub-states such as E-mail duties, setting interrupt rules for particular agents, and so on. For example, an agent residing at agent station 33 may be reported busy because he is answering E-mails and cannot be interrupted by a telephone call unless it is of priority 7 or above. In this case, if there are no other agents available to take the priority 7 call, it will be routed to the agent at agent station 33. He will accept the call and suspend his E-mail duty until he has disposed of the call, and so on.

The method and apparatus of the present invention allows for each agent's time to be best utilized according to skill-set and availability states. The software of the present invention can be integrated with any routing logic used at the call center such as skill-based routing and so on. It will be apparent to one with skill in the art that the method of the present invention may also be used with Internet-based communication and other forms of multi-media communication without departing from the spirit and scope of the present invention. For example, pre-routed E-mails could be assigned priority levels similar to those used with voice calls so that the higher priority E-mails are received and answered before lesser priority E-mails and so on.

In alternative embodiments of the present invention, priority determination and routing rules may be flexible, with reference to other criteria such as time-of-day and relative loading. Such criteria may be set to change automatically and/or to be responsive to administrative input.

As further examples of the flexibility of the systems of the invention, attention is again directed to FIG. 3. Agent group 71 comprises agents 1–4. Agent 1 is an agent in training and can only accept calls having a priority of 5 or less. The rules example illustrated with respect to the active state of agent 1 is indicative of a wide variety of limitations or conditions that can be programmed into the system via a system administrator, or configured by agent supervisor(s). When agent 1 logged-on to the system, his status was made available to reporting software via a database so that no calls above level 5 would be routed to that agent. The active states of agents 1–4 of agent group 71 are shown as reported to routing applications during the instance of placement of call 1. It will be apparent to one with skill in the art that availability status of agents such as agents 1–4 will change in real time as calls are placed. Agent 2 is available, but does not have a particular skill match required by call 1 such as being able to speak Spanish, etc. Agent 4 is reported busy answering E-mails and cannot be interrupted unless a call has a priority level of 9 or above. Agent 4 could receive call 1 except for a fact that agent 3 is determined available and is, in fact, the next available agent for call 1. Therefore call 1 is routed to agent 3.

Assume call 2 requires a Spanish-speaking agent and is now being placed and that agent 3 is now reported busy with call 1 (last placed call) with the status of agents 1, 2, and 4 being unchanged. In this instance, call 2 (now call 1) would be routed to agent 4. The rules example illustrated with respect to agent 4 is indicative of status reporting capability with regards to multiple sub-states with voice calls being a main state of agent availability (known to the inventors).

All calls in queue 69 are routed according to priority and according to agent availability with regards to multiple active states of agents. It will be apparent to one with skill in the art that there may be any number other than 7 calls in queue 69 as well as any number other than 4 agents in agent group 71 without departing from the spirit and scope of the present invention. The inventors choose to show this simple embodiment and deems it sufficient for the purpose of adequately illustrating the present invention.

It will further be apparent to one with skill in the art that the method and apparatus of the present invention may be applied to a call center that is not routing calls according to agent skill-set or agent availability based on a main state and sub states of agent activity. For example, higher priority calls may be routed to a next available agent assigned to that priority level or levels. The routing logic relating to skill-sets and agent availability based on multiple agent states are methods known to the inventors and covered in previous patent applications filed by the inventors. These routing methods are used here only to show the integration possibilities between the software of the present invention and other routing applications.

Figure 4:
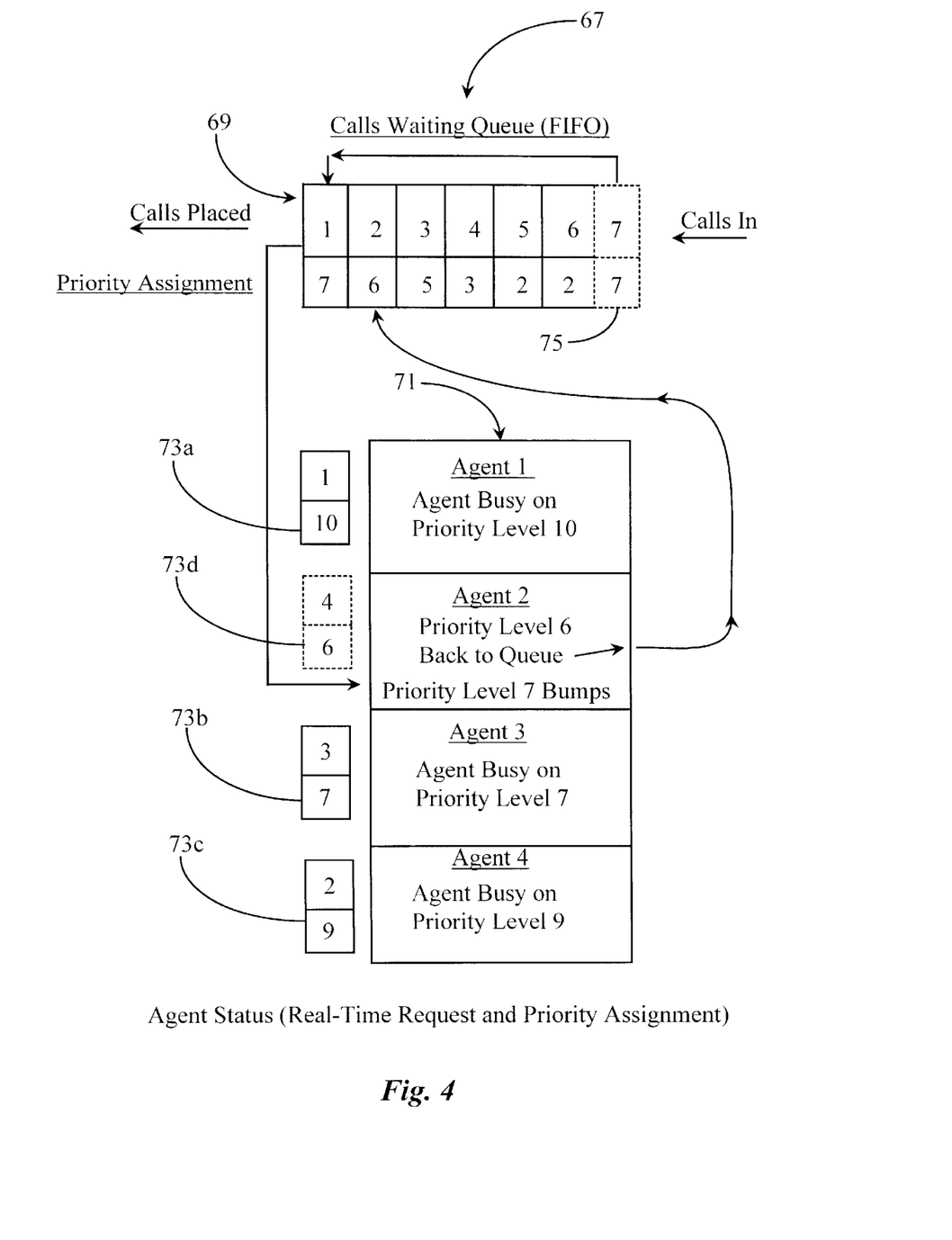
FIG. 4 is a block diagram illustrating the call-waiting queue and system of FIG. 3 showing call priority bumping according to an embodiment of the present invention.

FIG. 4 is a block diagram illustrating the call-waiting queue of FIG. 3 showing call priority bumping according to an embodiment of the present invention, wherein a call of higher priority may be accepted without losing the original call that was bumped. In FIG. 4 all agents are busy and a priority 7 call is to be routed. Calls in the queue are shown from the head of the queue in descending order of priority, because as new calls come in, process 67 assigns priority to the call and places the call in the queue (assigns order of placement) by descending order of priority assigned.

As an additional feature, call interruption may be prevented on low priority calls past a certain point in the script, to avoid "churning" of resources, where the redirection could take longer than finishing the call.

In this example, agent 1 is reported busy with a priority 10 call and cannot be interrupted by a lower priority call. Agent 3 is reported busy with a priority 7 call and cannot be interrupted with a same priority call. Agent 4 is reported busy with a priority 9 call and cannot be interrupted with a lower priority call. However, it is determined that agent 2 is busy with a priority 6 call and can be interrupted with a higher priority call. In this instance, call 1 is routed to agent 2 with an alert to the agent via screen pop-up, or other method known in the art, to dispose of call 6. In this case agent 2 sends the priority level 6 call back to queue 69 where it is promoted based on priority to call number 2 for re-routing. Agent 2 is now free to accept call 1. Agent 2 may have more options with regards to disposing of the priority level 6 call in other embodiments without departing from the spirit and scope of the present invention such as transferring to another agent, transferring to an automated voice response unit, etc. Also, the bumping could be completely automatic without further agent participation.

It will be apparent to the skilled artisan that features of the present invention may be practiced with other mediums of communication than voice calls without departing from the spirit and scope of the present invention, such as E-mails, Faxes, Video calls, and other types of multi-media communication mediums that can be utilized within a multi-media call center. For example, general address E-mails arriving from Internet 15 (FIG. 1) may be queued with priority assigned so that high priority E-mails are sent to designated agents and so on. With respect to Internet Protocol Network Telephony (IPNT) calls, for example, the calls could have priority assigned and be queued in much the same way as voice calls, except the distribution would be by routing to agent's PCs by way of LAN 57. Such a queue could be accomplished in processor 23 of FIG. 1, or on another server on the LAN, and be automated such that calls are routed according to programmed rules based on priority assignment, and also with reference to recorded agent skills.

It will also be apparent to one with skill in the art that the present invention can be applied to virtually any type of communication that can be received by an agent via telephone channel or computer connection, such as by LAN 57, without departing from the spirit and scope of the present invention. These include, but are not limited to COST calls, ISDN calls, E-mails, transferred word documents, IP calls, Video calls, Faxes, and other types of communication media such as may be known in the art. It will further be apparent to one with skill in the art that different priority levels may be applied to different modes of communicating without departing from the spirit and scope of the present invention. For example, COST calls may be programmed with a certain priority system while automated systems such as IVR systems may be programmed under a different priority system within the same call center, and under different rules than applied to the COST calls. A wide variety of differing embodiments are possible within a given call center, or in communication networks.

Fair Access in Reserving Agents

As described in the background section, latency variations inherent in different routing systems can cause inadvertent priority states (not related to assigned priority states described above) to exist for callers and groups of callers attempting to secure available agents in a communication center. The inventors provide a CTI system and software routine that eliminates or at least significantly reduces undesired priority states that may exist due to such latency differences.

The following enabling disclosure in this section will describe only the method and apparatus of the present invention that deals with the elimination of inadvertent priority states caused when more than one separate network-routing system having differing latency characteristics attempt to reserve agents in one communication center. Priority assignment with respect to queuing individual calls, which was described in FIGS. 1–4 above will not be discussed in this section for the sake of simplicity.

Figure 5:
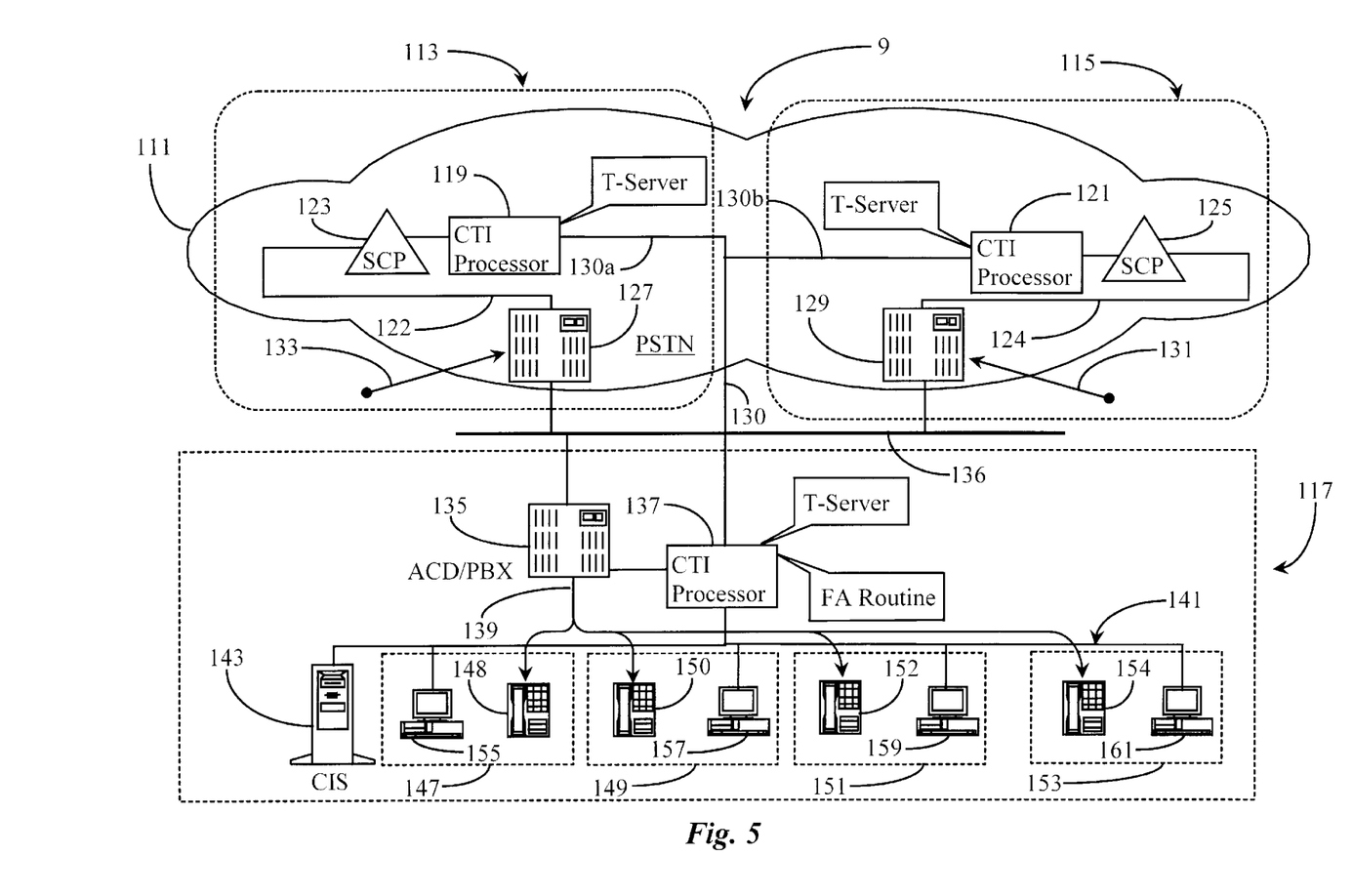
FIG. 5 is an overview of a network communication system enhanced with a fairness timing routine according to an embodiment of the present invention.

FIG. 5 is an overview of a network communication system 9 enhanced with a fairness-timing (FA) routine according to an embodiment of the present invention. Communication system 9 comprises a telephony network 111 and a connected communication center 117. Network 111 may be a PSTN network, an IPNT network, or a combination of the two. In this example, network 111 is a PSTN network and will serve to describe examples of the present invention.

Communication center 117 may be a large CTI service center, or any other type of CTI-enhanced communication center. Center 117 may also be capable of IPNT communication in combination with COST communication. In this example, communication center 117 is a CTI-enhanced telephony center and will serve to enable explanation of the present invention.

It is known that there are many separate routing systems that may exist within a PSTN network such as network 111. Two such systems illustrated herein are system 113 and system 115. Systems 113 and 115 are separate from each other in that they use separate equipment and connection lines as well as separate router intelligence to route telephony traffic. Systems 113 and 115 represent any two routing systems in network 111 that are not local to each other in a geographic sense.

Routing system 113 has a local telephony switch 127 adapted to receive calls from individuals operating in that locale. Switch 127 may be an ACD or PBX type switch, or any other type of telephony switch that may be known in the art. An incoming call represented by a vector 133 is illustrated as arriving at switch 127.

In this example, switch 127 is connected by a telephony data line 122 to a SCP 123. SCP 123 provides routing decisions to switch 127 for calls 133. For example, calls from individuals using a 1-900 number, a 1-800 number, or the like for contacting communication center 17 are routed by SCP 123.

SCP 123 is enhanced by a CTI processor 119. Processor 119 enhances functionality of SCP 123 by virtue of software provided by the host of communication center 117. Such software enables communication center 117 to control routing of calls within network 111 according to enterprise rules. For example, an instance of a CTI application known as T-Server (known to the inventors) is provided and executable on processor 119. T-Server software provides a wide variety of intelligent routing routines that may be executed to determine how SCP 123 will route calls.

Routing system 115 has an equipment and connection scheme that, for the purpose of this invention, mirrors the components and elements in system 113. For example, a CTI switch 129 is provided and adapted to receive calls 131 from individuals in that locale. Switch 129 is connected to a SCP 125 by a data connection 124. A connected CTI processor 121 running an instance of T-server software enhances SCP 125.

It will be apparent to one with skill in the art that the equipment and exact connection schemes may vary from one routing system to another within network 111. However, the inventors illustrate identical schemes in each illustrated routing system 113 and 115 for the purpose of simplifying explanation of the present invention. Moreover, in a network such as PSTN 111, there may be many more separate routing systems than are illustrated here. However, the inventors deem that the illustration of two such systems in this example is sufficient to explain the present invention.

Both routing systems 113 and 115 are used to route incoming calls to communication center 117. To this end, communication center 117 is appropriately equipped to receive calls routed thereto by system 113 and system 115. For example, communication center 117 has a CTI telephony switch 135 that is adapted to receive calls from network 111. Switch 135 may be an ACD, PBX, or any other type of telephony switching system that is known in the art. Switch 135 is CTI-enhanced by virtue of a connected CTI processor 137 running an instance of T-server software. Switch 135 acts as a central switch for communication center 117. That is, all calls arriving from network 111 are received at switch 135 and distributed to individual agent stations 147–153.

Switch 135 is connected, by virtue of internal telephony wiring 139, to a plurality of agent-manned telephones 148, 150, 152, and 154. Telephones 148–154 are implemented one each at separate agent workstations 147, 149, 151 and 153 respectively. Stations 147–153 are equipped with agent-operated personal computer/video display units (PC/VDU's) that are connected to each other, and to a customer information server (CIS) 143 by a local area network (LAN) 141.

CTI processors 137 (center 117), 119 (routing system 113), and 121 (routing system 115) have digital networks 130a and 130b separate from telephony trunk lines 136 over which voice calls are routed. Networks 130a and 130b are adapted to enable data communication between such connected CTI processors. Communicated data may include such as command and control data, call information data, and the like. In this way, information about a call may arrive at communication center 117 ahead of an actual routed call. This allows agents operating at workstations such as stations 147–153 access to pre-event information and better prepares them to handle incoming calls. Separate links 130a and 130b are depicted to emphasize that call latency may well differ. In reality, routing latency may differ even if the two routing systems share the same digital network.

In an enhanced telephony communication system such as system 9 described above, incoming calls 133 and 131 are routed from respective switches 127 and 129 to switch 135 over telephony infrastructure represented herein by trunk 136, which represents varied and alternative routing paths through network 111.

It will be appreciated that, in actual practice, routing systems 113 and 115 as well as network paths through infrastructure 136 will, in many cases, exhibit different latency characteristics. For example, routing system 113 may have older and slower equipment and slower network connections than routing system 115. If so, then routing system 113 will exhibit a higher latency for transactions with center 117 than will routing system 115. This latency difference can cause groups of callers from system 115 to enjoy, without design, better access to available agents in communication center 117. This is at least partly due to the requisite nature of telephony routing protocol. A network router must request a routing event, receive information regarding routing options, and only then can the router route the call from the local switch to a communication center.

A request for a routing event by a network router in embodiments of the present invention is made over the same network data links (130a, 130b) that are used for parallel data transfer, as described above. The request can be a negotiation between processors separate from the transfer of data from a network routing system (113, 115), or it may be combined with the data transfer. Similarly, in some embodiments of the invention the identity of the network router needs be known, and this piece of information may also be combined in the parallel data transfer for a pending call.

It will be apparent to the skilled artisan as well that the examples of the invention described with reference to two network routing systems (113, 115) are not limiting. Call requests may be negotiated in a call center with network routers as shown and described, but also between a call canter and other entities. Requests for routing may come from overflow at another call center, or in a load-balancing arrangement with several other centers, for example. The practice of the invention applies to all architectures wherein call reservation requests may come to one center from another source.

To alleviate the problem of inadvertent preference or priority as stated above, the inventors provide herein a software routine termed a "fair access" (FA) routine. The FA routine executes on CTI processor 137, and may be integrated with T-server software. The inventors illustrate the FA routine separately from T-server software simply to show separate function. The FA software provides a fairness timer function each time an agent is reserved, and denies access to that agent to any incoming request route until the time period has expired. When the fairness time expires, than access is awarded to a call based on an algorithm that awards access based on a round robin system or a performance history of each routing system.

In actual practice, the FA routine is integrated with other CTI applications and routines that may be in place at communication center 117 and in network 111 by virtue of T-server software. By using the FA routine, communication center 117 can provide more equal and fair agent access to separate routing systems such as systems 113 and 115, regardless of their latency characteristics. A detailed description of a T-server routine enhanced with the FA routine of the present invention is provided below.

Figure 6:
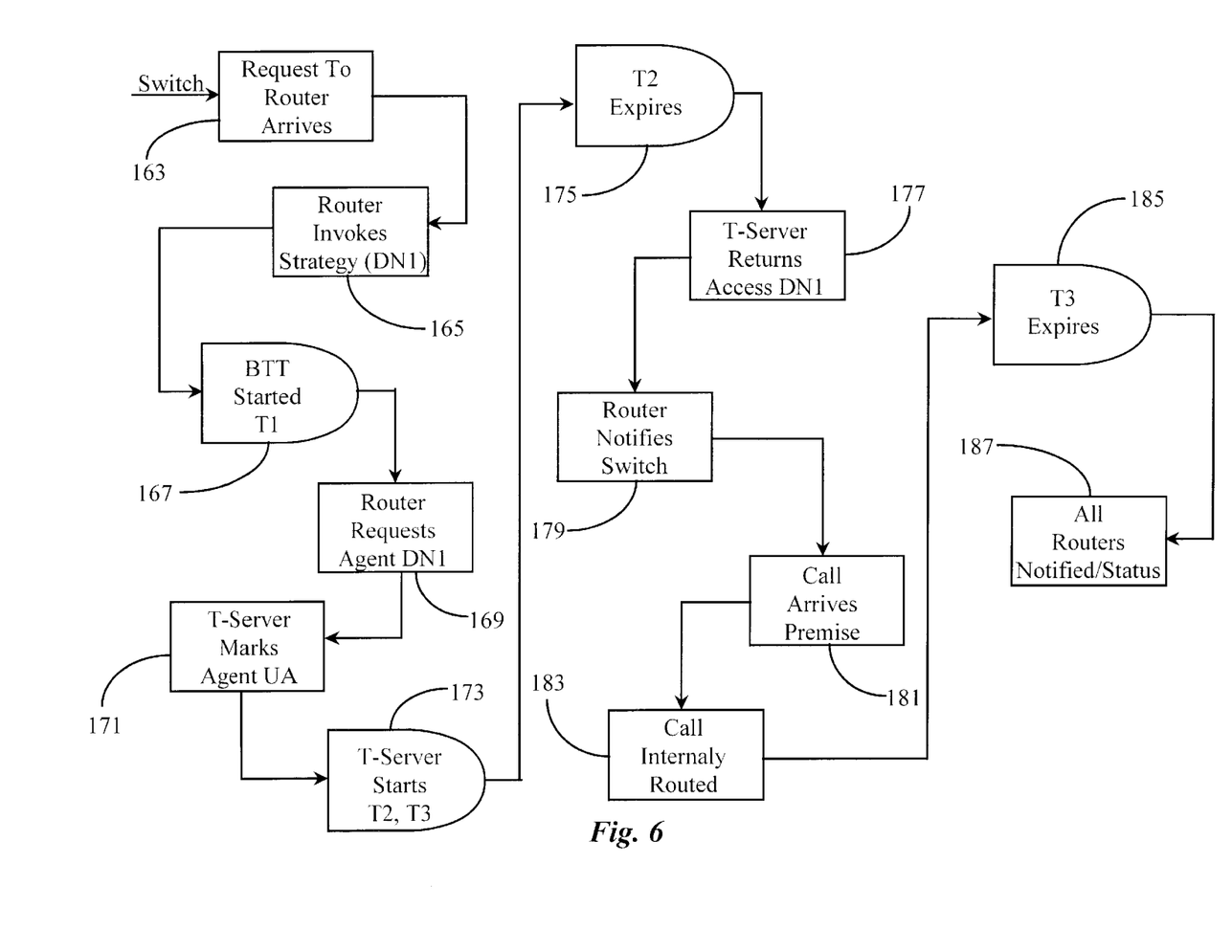
FIG. 6 is a process flow chart illustrating steps for reserving and connecting to an agent using a single router according to an embodiment of the present invention.

FIG. 6 is a process flow chart illustrating steps for reserving and connecting to an agent using a single router according to an embodiment of the present invention. The exemplary process represented herein illustrates a T-server routine integrated with a FA routine being executed for one call request made by one routing system such as system 113 of FIG. 5. This example may be used in conjunction with elements described in FIG. 5 to gain an understanding of the unique FA software. Therefore, many references will be made to elements of FIG. 5 throughout following example.

At step 163, a request to route arrives at a SCP such as SCP 123 (router) from a local network switch such as switch 127. The request is initiated by call 133, which is waiting to be connected to an agent at center 117. At step 165, SCP 123 invokes a routing strategy based on information from or about caller 133 and T-server software running on CTI processor 119. The strategy invoked in step 165 includes the selection of a destination number (DN1) for an agent at communication center 117.

At step 167, a busy treatment timer (BTT), or T1, is started at SCP 123. The BTT (T1) determines how long a call must be held at a routing point before parking it in queue. Ideally, the BTT time period should be less than the maximum required response time (RRT) minus network round-trip latency (SCP 123 to CTI processor 137) minus T-server and router processing latencies. For example, if RRT equals 500 ms and round-trip delay (RTD) equals 60 ms, and T-server/Router latency is 210 ms, then the BTT for call 133 should be set for 230 ms.

At step 169, SCP 123 requests an agent from T-server software running on CTI processor 119. Such an agent may be one operating at workstation 153 taking calls at telephone 154 on DN1, which may be, in this example, the number for telephone 154. At steps 171 and 173 T-server software running on processor 137 marks the agent at workstation 153 unavailable and starts an FA timer (T2), and an agent reservation timer (T3). The FA timer sets a period of time during which other routing systems may request access to a same agent, before one router will be granted access to the agent. In this example, however, there are no competing requests. No access is granted to any requesting router until T2 expires in step 175.

When FA timer T2 expires in step 175, T-server software running on processor 137 returns access confirmation for DN1 to SCP 123 at step 177. At step 179, SCP 123 notifies switch 127 to route call 133 to DN1. At step 181 call 133 arrives at switch 135. Having successfully acquired access to the agent at workstation 153, call 133 is internally routed in step 183 to telephone 154 over wiring 139.

At step 185, T3 (agent reservation timer) expires but the current agent status reported to network routers such as SCP 125 is that the agent is busy with call 133. At step 187, all network routers are updated of DN1 status, which is busy.

FA timer (T2) is necessary to provide fair distribution of available agents between all separate routing systems competing for connection. Without T2, the routing systems with the shortest latency periods would acquire preferential access to all agents, as they became available. If all routing systems have the same delay factor (highly unlikely), then the T2 timer may be set to zero.

It is found through empirical method that in some cases the value of T2 should be about two times the difference in latency between the most geographically distant, and the closest network routers, which are configured in the loop. The latency factors for each network router should be measured at approximately 95% delivery-probability time. This will insure that 95% of all calls will be processed according to a fair distribution algorithm.

It will be apparent to one with skill in the art that the example presented above involves only one network router requesting an agent. Therefore, a fairness algorithm was not invoked in this example. If another router had requested an agent during time period T2, then a fairness algorithm would be called once T2 had expired. An example of more than one router competing for an agent is provided below.

The agent reservation time T3 is the time that agents are marked as unavailable when they are reserved for a call. This time period is long enough for a reserving voice call to be routed through network 111, arrive at switch 135, be presented to the agent, and notification of agent status to be sent to all other network routers. If this time period is set too short, then there is a chance that one agent will receive two calls. If T3 is set for too long a period, the agent may be idle well after he has terminated the last event. A suggested time limit is approximately 10 seconds.

If agents in a communication center such as center 117 are routinely handling very short calls of only a few seconds or so, T3 may be canceled and an event-release detection (ERD) routine (known to the inventors) may be incorporated in T-server software running on CTI processor 137 (FIG. 5). An ERD routine detects released events for each agent at each DN and sends notification to all network routers.

It will be apparent to one with skill in the art that the process steps above may vary somewhat according to enterprise rules without departing from the spirit and scope of the present invention. For example, there may well be additional steps as well as sub-routines involved in actual practice. The inventors intend that the process steps illustrated herein only to be one example of a basic routine using only one router. A more complex interaction is provided below.

Figure 7:
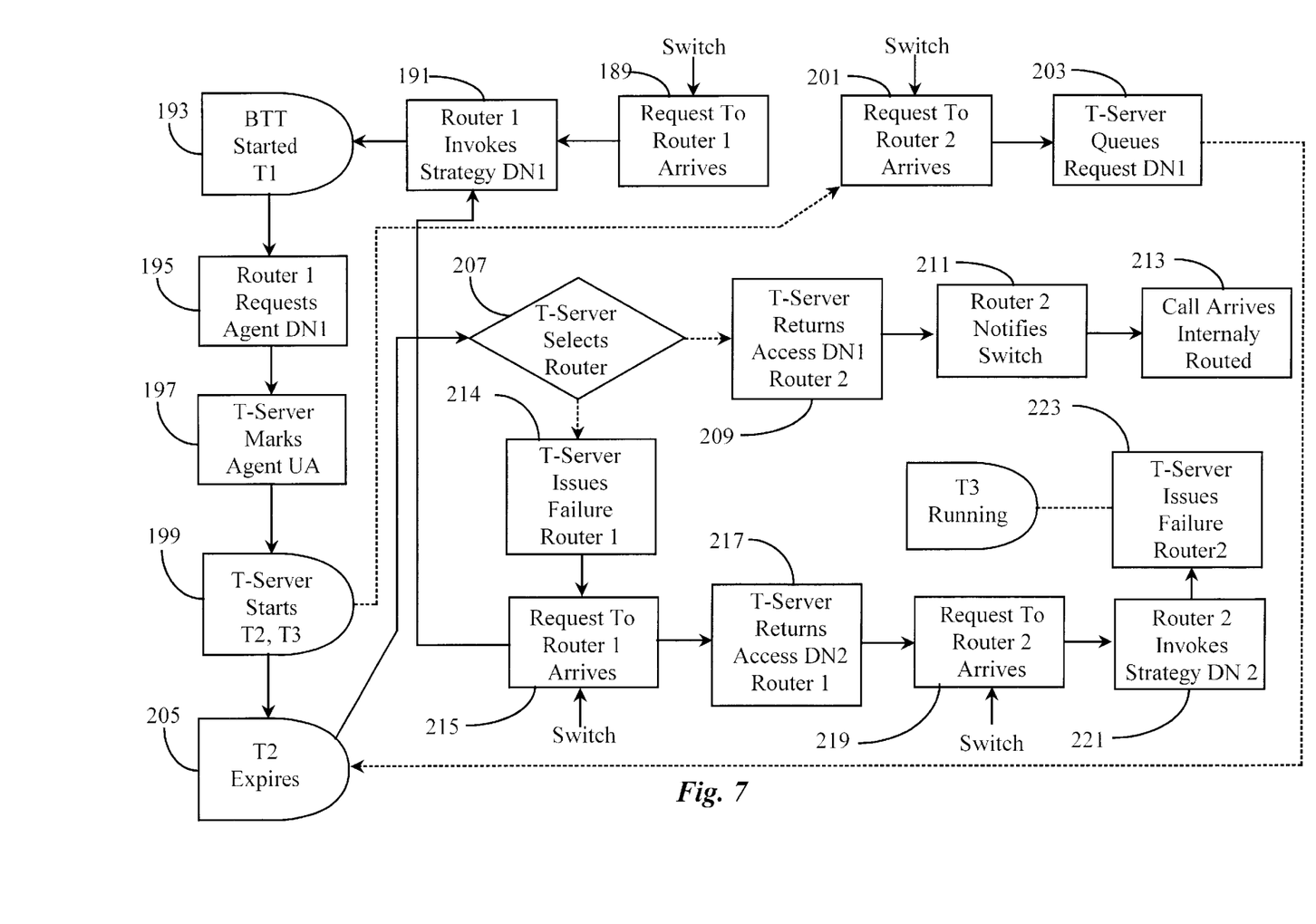
FIG. 7 is a process flow chart illustrating steps for determining which of two network-level routing systems will be granted access to an agent according to an embodiment of the present invention.

FIG. 7 is a process flow chart illustrating steps for determining which of two network-level routing systems will be granted access to an agent according to an embodiment of the present invention. As with the example above referencing FIG. 6, the embodiment of FIG. 5 and elements contained therein will be referenced throughout this example.

At step 189, a route request arrives at SCP 123 from local switch 127 on behalf of call 133. SCP 123 invokes a routing strategy and selects DN1 in step 191. At step 193, a busy treatment timer T1 is started. At step 195, SCP 123 requests an agent on DN1. At step 197, T-server marks the agent as unavailable. In step 199, T-server starts T2 (fairness timer) and T3 (reservation timer).

Note that the above-described process steps are the same as steps 163–173 described in FIG. 6, however, before T2 expires, a second routing system comes into play. Following the broken direction line from step 199, at step 201, a route request arrives at SCP 125 of routing system 115. The request arrives from local switch 129 on behalf of call 131. SCP 125 (competing router) repeats steps 191, 193, and 195 for a request of DN1. At step 203, T-server (processor 137 at center 117) queues the request for DN1 by SCP 125. It is noted here that SCP 123 has already reserved the agent at DN1, therefore, T2 and T3 have already been started (step 199). If additional routing systems (none shown) make requests for DN1 during the time period of T2, the requests will also be queued by T-server software running on processor 137.

Following the broken direction line from step 203, in step 205, T2 expires. Step 205 triggers step 207 as indicated by the solid direction line. In step 207, T-server software, by virtue of a FA routine employs an algorithm to determine which requesting routing system 113, or 115 (FIG. 5) will be granted access to DN1. The fairness algorithm may, in one embodiment, be based on an arbitrary rotation scheme between network routers such as SCP's 123 and 125. In another embodiment, statistical analysis may be used to keep individual percentages of granted requests to each routing system fairly even. This method would also take into account total requests from each routing system so as not to penalize one system for lack of requests. The fairness algorithm may be any one of many possible schemes. Employing the fairness timer (T2) insures that unintentional preferences or priorities are cancelled out for all routing systems.

At step 209, T-server employing the FA routine returns access for DN1 to router 2 (SCP 125) even though router 1 (SCP 123) was first to reserve an agent at DN1. At step 214, illustrated below step 207, T-server issues a failure notification regarding DN1 to SCP 123 in system 113. Steps 209 and 210 occur simultaneously and are indicated by broken direction lines emanating from step 207. Steps 211 and 213 represent the routing of call 131 from switch 129 to switch 135, and further internal routing to an agent at DN1, in this case one picking up telephone 154 at workstation 153.

Moving to step 215, another route request from local switch 127 to SCP 123 (router 1) arrives. Following the broken direction line from step 215, the process repeats steps 191–205, however in this case SCP 123 selects DN2 in the routing strategy (191). When T2 expires for DN2 (205), T-server returns access for DN2 to SCP 123. In this case no competing router made a request for DN2 during T2 time, therefore access was granted to SCP 123 (step 217).

At step 219, another route request arrives at SCP 125 from local switch 129. SCP 125 invokes a routing strategy in step 221 and selects DN2. However, the T3 timer (agent unavailable) invoked in step 199 for the agent at DN2 is still running. Therefore, T-server issues an immediate failure notification to SCP 125 in step 223. It will be noted here that while T2 and T3 timers are both running, competing requests for a same agent are queued as in step 203. At the end of T2 time, the fairness algorithm determines which router will get access. After T2, but during T3, the agent will be unavailable to all routers until T3 expires, unless an ERD routine is in place as described in FIG. 6.

It will be apparent to one with skill in the art that the process steps described above may vary according to communication center capability and enterprise rules without departing from the spirit and scope of the present invention. There may be added routines, and sub routines included and integrated with the various routing strategies of a communication center such as center 117.

Promoting Fairness by Varying Fairness Time

It was previously disclosed above that the fairness time (T2) is defined as a length of time that any routing system must wait for reservation confirmation when requesting a particular destination number (DN). The purpose is to promote fairness, allowing other routers to request the same DN during the time T2, after which a fairness algorithm awards the DN to one of the requesting routers. The timer for T2 is started at the instant that a first request for a particular DN is received from any routing system. A round robin system or statistical analysis, for example, is used to determine which of the routing systems will actually get confirmation of the DN.

In the embodiments above-described, the fairness time imposed, during which other routers may also request the same DN requested by a first router, is a constant time, computed by one or another algorithms based on latency. There are other ways a timer may be used to promote fairness, some of which are relatively simple, and others of which are more complicated.

A simple fairness system monitors and stores latency values for individual routers, and imposes a wait time for any request from a router, based on that routers current latency. A fast router is assigned a longer wait time, and the slowest router never waits at all.

In another, more complicated alternative embodiment, T2 would not be specific to a particular destination number. Instead a delay timer is started for any request, such that all systems must wait before being noticed as requestors of any DN. Therefore T2 is considered a wait time. A second time period of T3 (fairness time) may be provided and started after a first routing system is noticed and confirmed requesting a particular DN.

In this embodiment, all routing systems such as systems 113 and 115 of FIG. 5 are periodically monitored for average latency. Latency for this purpose is defined as the time it takes each routing system to receive and log a request for a DN into the communication center's switch such as switch 135 of FIG. 5. Latency monitoring may be performed periodically or continually by methods known in the art. In this case all routing systems must be identified in terms of equipment type and network connection, and their network routes must be known.

The average latency factor over all routing systems is then used as an imposed fairness constant, meaning that each request arriving under the fairness constant must wait the difference of their stated latency average and the fairness constant before being noticed. A slower system whose latency exceeds the fairness constant is not forced to wait any time.

T3 time may be started when a first routing system is noticed requesting a particular DN as described above. For example, assume that systems 113 and 115 are faster than the fairness constant, and that requests from both systems come in at the same instant for a same DN. If system 113 waits 50 ms T2 time, and system 115 waits 60 ms T2 time, then a T3 time is imposed at the expiration of 50 ms (system 113). After 10 ms, system 115 is recognized and queued for the same DN. T3 time, in this embodiment, may be much shorter than the T2 time described in the previous embodiment described above as the faster routing systems are buffered before being officially recognized at center 117.

In this way, a slower routing system may still compete with faster systems. All systems are continually monitored for their current latency due to the fact that these figures will not remain constant over long periods of time. Therefore, the latency constant for a communication center may constantly change. Moreover, wait times for each separate system are continually adjusted against the latest data.

As a further example, consider three separate routing systems A, B, and C that are routing requests to a communication center such as center 117 (FIG. 5). If system A is operating with a 100 ms latency, system B at 300 ms latency, and system C at 60 ms latency then the average latency for all three systems is 153.33 ms latency. If there are no other systems routing to communication center 117 then the fairness constant is set at 153 ms.

When a request for a DN arrives from system C (fastest system), then a fairness time of 93 ms must expire before a DN request is noticed. System A requires an additional 53 ms of fairness time before a DN request is noticed. This insures that both systems A and C wait the standard time before either one can be considered for an available DN. However, system B has a latency factor that exceeds the fairness constant. In this case, no fairness time is imposed. This insures that the slower systems may compete with the faster systems in reserving available agents.

At first glance, the system does not seem fair because if all three systems compete for a DN, and have initiated their requests within a few ms of each other, systems A and C will move to a T3 time and be included in a fairness algorithm at the expiration of T3 before the request from B is even received. In this case A or C will get the DN and the DN will be unavailable to B. However, if any request is received from B wherein there are no other requests for the same DN yet received by systems A or C, system B is immediately awarded the DN reservation without moving to a fairness algorithm because no wait time is imposed. If a request for a same DN arrives from system B during a wait time (T2) imposed on A, C, or both, then B will still get confirmation because A and C are not yet noticed. If a request arrives from B during a T3 fairness time for systems A and/or B, then the fairness algorithm is invoked to include system B giving it a chance to be considered for the DN number.

In one embodiment, fairness time T3 may be set to equal the latency rate of the slowest routing system. This would give system B a chance to get into the fairness algorithm if the requests were initiated at the same time, or the request from B was initiated slightly ahead of the faster routing systems.

In actual practice, many requests may come in at any time for any available DN's and only the systems that perform faster than the calculated latency average of all systems routing to communication center 17 are delayed with a wait time (T2) in order to buffer them to the average latency figure.

If there is more than one routing system that has a latency greater than the fairness constant competing for one DN, then the fairness algorithm may be invoked for those systems. This would require that requests from those systems arrive within a time period reserved for processing one successful request, as no formal fairness time would be imposed. For example, if a system A and a system B both have latencies that exceed the average fairness constant and their requests arrive in the order of A and then B, then B will be considered as long as the DN has not yet been released to A.

Integrating Priority Assignment and Fair Access

As described in the background section, a desirable goal, and an object of the present invention is to integrate the capabilities of a priority queuing routine (FIGS. 1–4) and a fairness access routine (FIGS. 5–7) such that incoming callers that enjoy certain priority states in a communication center and may also have fair treatment when attempting to reserve available agents regardless of any latency difference resulting from separate network-routing sources.

In a previous embodiment described above, call priority queuing is preferably performed in a communication center queue such as queue 67 of FIGS. 3 and 4. However, it was also mentioned that priority assignment might also be performed at the network level. For the purpose of the present invention, it will be assumed that an integrated system wherein priority assignment and fairness treatment is practiced will have priority assigned, preferably, at the network level such that priority is already known when a request to reserve an agent arrives. Moreover, for the present discussion it is assumed that a uniform priority assignment scheme is practiced among all of the routers routing to a single communication center. However, assigning priority within the communication center is also possible in various embodiments without departing from the spirit and scope of the present invention.

FIG. 5 and elements contained therein is referenced for the purpose of explaining the dynamics of an integrated system of priority and fairness treatment. This is because the exemplary architecture of FIG. 5 represents two separate routing systems, and has appropriate CTI architecture in place at the network level to practice the integrated invention.

Referring now to FIG. 5, CTI processors 119 and 121 in network 111 are running an instance of T-server software (known to the inventors) that allows SCP's 123 and 125 to perform various intelligent routing routines such as routing by skill level, statistics, agent availability, and so on. As previously described above, SCP's 123 and 125 make requests and perform routing on behalf of calls destined to center 117 such as calls 133 and calls 131 respectively.

Criteria for assigning priority to calls may be implemented in T-server applications running on processors 119 and 121. Any rules may be used to determine a priority scheme. In one embodiment, such rules may include interactive voice response (IVR) interaction with a caller at the network level in order to determine a priority level for the particular call. Based on the interaction, a priority level is tagged to the request.

In other cases, known information may be accessed about callers from CIS server 143 in communication center 117. For example, SCP 123 is notified of a call 133 at switch 127 that according to destination information should be routed to communication center 117. SCP may, by virtue of T-server software running on processor 119, request data about the caller from CIS server 143 over digital links 130 and 130a. Such data may be used to assign a call priority level. In other cases such caller data may already reside in a statistics server at the network level, and may be updated on a continuous basis from the call center level.

In one case, a priority level will be assigned to a call such as call 133 before a request to reserve a DN is initiated. In this way, priority level is known at center 117 upon arrival of a reservation request prior to an actual call arriving at such as switch 135 in center 117. In this case the priority may be included in a DN request to the communication center, so two separate data instances will not be needed. In another case, a request for a DN may be initiated at SCP 123 without a priority yet assigned. In this case, priority my be assigned at center 117 with priority level notification sent back to SCP 123 with a successful DN confirmation. In either case, a priority level is known at center 117 before the actual call (133) is routed. Therefore, a priority queue may be held at switch 135 and calls queued accordingly as described in FIGS. 3 and 4. Alternatively, a virtual queue may be held at individual SCP's such as SCP 123 in network 111.

In one aspect of the present invention, a DN is allowed a certain number of calls to be held in queue before being marked as unavailable. In this embodiment requests for same DN numbers are granted until the priority queue is full. Once the priority queue if full then the DN is marked unavailable unless a higher priority request comes in. If this happens, a lowest priority call in queue is either transferred to an overflow queue, to an IVR, or it may be dumped.

It was disclosed above in reference to fairness treatment that a T2 time is, in one embodiment, generic to a particular DN, and the fairness algorithm is employed when more than one separate routing system is requesting the same DN within the allotted time period. In this embodiment, competition between separate routing systems requesting a particular DN may also include a parameter of known priority.

Using FIG. 5, assume that system 113 and system 115 are requesting a DN that is an agent operating at station 153 using telephone 154 in communication center 117. Call 133 has been assigned a level 9 priority while call 131 has been assigned a 5 priority using a 1–10 rating system.

Assume that the priority queue limit in switch 135 at center 117 is 10 calls before the agent at station 153 is deemed unavailable. If there are 9 calls in queue with the lowest priority being one call at a level 4, only one more confirmation for a DN at station 153 may be made. At the end of T2 time, calls 133 and 131 must go to fairness algorithm. In this case, the fairness algorithm takes priority level into account when making a decision.

Therefore SCP's 123 and 121 both receive successful notification of DN reservations. Call 133, a level 9 call, is routed to switch 135 and queued accordingly. Call 131 is also routed to switch 135 and bumps the level 4 call in the queue thereby becoming the last call in the queue. The level 4 call may be transferred to a general queue, to an IVR, or some other automated response system.

The rules governing the fairness algorithm may vary with respect to priority level. For example, if a fairness algorithm is employed for separate routing systems wherein there is, for example, a 7 priority or higher, then priority may be considered over statistical figures regarding number of DN awards. If no priority level is 7 or higher then the fairness routine may be instructed to ignore priority and stick to a round robin or other statistical award system.

In the simple case of assigning a wait time to faster routers with the time length based on latency (inverse relationship) known priority may simply be used as another factor in determining the wait time. For example, a fast router may be accorded a long wait time due to its speed over other routers, but that time may be foreshortened for high priority calls, such that there will be no wait time at all.

Calls arriving from separate routing systems will exhibit random priority levels such that awarding on priority should not be construed as unfair as long as an overflow system such as an IVR or, perhaps, an agent of lesser skills is available to handle any bumped calls.

Another embodiment utilizes the fairness scheme described above wherein separate routing systems are assigned varying wait times based on their latencies against an average latency constant. In this embodiment, faster routing systems must wait until the average latency time is met from the point of request initiation to arrival at switch 135+any difference required to equal the average latency figure currently accepted in the communication center before being noticed for a DN request. Routing systems that are slower than the averaged constant are not forced to wait. In this embodiment, priority levels may also be considered when running a fairness routine.

In a case where priority is set at individual SCP's then such priority levels, if high, may be used to subtract incremental amounts of wait time $T_2$ associated with routing systems that are faster than the average latency. Likewise, if such priority is low then incremental time periods may be added to $T_2$. Moreover, such incremental time adjustments may be made to $T_3$ time instead.

In still another embodiment, priority levels may be set at communication center 117 instead of at the network level, with priority status sent back with each DN confirmation. In this embodiment, priority level may be based on additional information held at communication center 117 such as in CIS server 143. In this case, priority level is tagged to the actual incoming calls arriving at switch 135, and calls arriving may be queued accordingly.

It should be apparent to one with skill in the art that fairness treatment routines may be integrated with priority assignment at the network level, in communication center 117, or in a combination of both. For example, in an agent level routing environment wherein separate routing systems route calls directly to agents working in a communication center such as center 117, virtual priority queues may be held at individual SCP's. Actual priority queuing may be performed at a communication center switch such as switch 135. There are many variant possibilities.

It should also be apparent that there may be many routing systems of varying latency rates connected to one or a number of communication centers practicing the present invention. In this case there may be premise-to-premise routing. Such cases are handled in the same fashion as network-to-premise cases.

The present invention may be practiced in a communication center that is enhanced for IP telephony as well as COST telephony, and may be modified to work with alternate forms of media such as voice mail and the like. Therefore, the method and apparatus of the present invention should be afforded the broadest scope. The spirit and scope of the present invention is limited only by the claims that follow.

What is claimed is:

1. In a communication center, a method for promoting fairness in response to requests for destination numbers (DNs) from network-level routers, comprising steps of:
    (a) determining latency for requests from individual ones of the network-level routers;
    (b) receiving a request from a first router for which latency is determined;
    (c) assigning a fairness wait time to the request, the time determined in inverse relationship to the latency; and
    (d) answering the request according to rules in effect only after the wait time has expired.

2. The method of claim 1 further comprising a step for starting a second fairness timer after the wait time, and at the end of the second time period, a step, if there are requests from-other than the first router for the same DN, for calling a fairness algorithm to determine which router gets the DN.

3. The method of claim 1 the requests are for telephony connections, either connection-oriented switched telephony (COST) or Internet Protocol Network Telephony (IPNT) calls.

4. The method of claim 2 further comprising a step for starting an agent reservation timer at the same time as starting the second fairness timer, the agent reservation timer having a period longer than that of the fairness timer.

5. A communication center, comprising:
    a communication switching device connected to agent stations having destination numbers (DNs) for switching communications to individual ones of the agent stations;
    a computer-telephony integration (CTI) processor coupled to and monitoring and controlling the communication switching device; and
    a digital link between the CTI processor and network-level routers having determined latency, for receiving requests from the network-level routers for connection to DNs;
    wherein the CTI processor, on receiving a request from a router for a DN, checks the router's latency, and assigns a wait time according to the latency before processing the request.

6. The communication center of claim 5 wherein requests are received with priority assigned, and the wait time is adjusted according to the priority.

7. A communication center, comprising:
    a communication switching device connected to agent stations having destination numbers (DNs) for switching communications to individual ones of the agent stations;
    a computer-telephony integration (CTI) processor coupled to and monitoring and controlling the communication switching device; and
    a digital link between the CTI processor and network-level routers, for receiving requests from the network-level routers for connection to DNs, the requests having priority assigned;
    wherein the CTI processor, on receiving a request from a router for a DN, imposes a fairness wait time after which, if more than one router has requested a same DN, statistical history and priority are used by a fairness algorithm to award the DN to one of the routers.

8. The communication center of claim 7 wherein latency and priority are used to adjust the fairness wait time.

9. The communication center of claim 7 wherein the connection requests are for telephony connections, either connection-oriented switched telephony (COST) or Internet Protocol Network Telephony (IPNT) calls.

10. The communication center of claim 7 wherein the CTI processor starts an agent reservation timer at the same time as starting the fairness timer, the agent reservation timer having a period longer than that of the fairness timer.

11. The communication center of claim 10 wherein the period of the agent reservation timer is longer than that of the fairness timer by a time sufficient for a connection to be made to the agent station once access is granted, and for notification of the connection to be made to network-level entities.

12. An agent-reservation fairness software suite for operation in a communication center and dealing with requests by network-level routers for connection to agents at communication center destination numbers (DNs), comprising:
    a monitor for monitoring incoming requests for connection to agents;
    a table of latency for individual ones of the routers;
    a time generator for setting a wait time according to latency; and
    an initiator for starting a fairness wait timer having a fairness time-out period;
    wherein the monitor, on receiving a request from a router, checks latency for the router, the time generator generates a time-out time based on the latency, and the initiator starts the timer for the generated time-out period, after which the request is processed.

13. The software suite of claim 12 wherein requests come with a priority indication, and the time generator incorporates the priority along with latency into determining the time-out time.

14. The software suite of claim 12 further comprising a fairness determinator, which, after the fairness time out period, if there are plural requests for a same DN during the time-out period, determines which router gets the DN based on a fairness algorithm.

15. The software suite of claim 14, wherein the fairness time is a constant, and priority is included in the fairness algorithm to determine which router gets a DN.

* * * * *